United States Patent [19]

Barzilai et al.

[11] Patent Number: 5,354,967
[45] Date of Patent: Oct. 11, 1994

[54] HAIR STYLING APPLIANCE HEATER AND CONTROL

[75] Inventors: Yinon Barzilai; William Levy; Robert Sherwood, all of El Paso, Tex.

[73] Assignee: Helen of Troy Corporation, El Paso, Tex.

[21] Appl. No.: 976,022

[22] Filed: Nov. 13, 1992

[51] Int. Cl.⁵ .................. H05B 1/02; A45D 1/04
[52] U.S. Cl. ................... 219/225; 219/502; 219/499; 219/501; 219/241; 219/222; 132/229; 132/232
[58] Field of Search ............. 219/225, 497, 499, 501, 219/506, 502, 245, 241; 366/143; 132/229, 232; 307/39, 71, 117

[56] References Cited

U.S. PATENT DOCUMENTS

| | | |
|---|---|---|
| 3,129,314 | 8/1960 | Hage et al. |
| 3,308,271 | 3/1967 | Hilbiber ................ 219/210 |
| 3,646,577 | 2/1972 | Ernst . |
| 4,045,763 | 8/1977 | Miyamoto et al. . |
| 4,086,466 | 4/1978 | Scharlack . |
| 4,097,718 | 6/1978 | Weise . |
| 4,243,875 | 1/1981 | Chang . |
| 4,267,430 | 5/1981 | Downey ................ 219/222 |
| 4,365,140 | 12/1982 | Bast et al. ............. 219/225 |
| 4,365,426 | 12/1982 | Suzuki et al. . |
| 4,382,448 | 5/1983 | Tittert . |
| 4,549,560 | 10/1985 | Andis . |
| 4,598,195 | 7/1986 | Matsuo . |
| 4,623,779 | 11/1986 | Raab . |
| 4,673,798 | 6/1987 | Contri et al. . |
| 4,692,586 | 9/1987 | Fromm ................ 219/225 |
| 4,697,066 | 9/1987 | Glucksman . |
| 4,841,127 | 6/1989 | Prager et al. . |
| 4,864,488 | 9/1989 | Bulmahn et al. ....... 363/143 |
| 4,968,870 | 11/1990 | Moon . |
| 5,088,019 | 2/1992 | Williams et al. ....... 363/143 |
| 5,162,984 | 11/1992 | Castagnet et al. ...... 363/143 |

Primary Examiner—Mark H. Paschall
Attorney, Agent, or Firm—Watson, Cole, Grindle & Watson

[57] ABSTRACT

A low cost heater element is disclosed which is formed of a wire wound mica paper substrate and a mica paper cover and a low cost diode acting as a negative temperature coefficient of resistance NTC temperature sensor. A control circuit provides power to the heater element in proportion to the line voltage. As a result, a light weight, low cost heater element is employed for various line voltages available throughout the world. The system employs digital logic to achieve temperature sensing, power sensing and indication that the system is on and operating at the correct temperature.

21 Claims, 6 Drawing Sheets

HAIR STYLING APPLIANCE HEATER AND CONTROL

BACKGROUND OF THE INVENTION

The invention relates to heated hair styling appliances. In particular, the invention pertains to a conductive heater and control for a curling iron which provides even heat distribution, temperature feedback, fast temperature recovery and various safety and convenience features.

Many conventional heaters for hair curling irons rely on radiation to carry energy to the barrel portion for heating the hair. Such radiative heaters are inefficient and are difficult to control by temperature feedback.

A heater as shown in U.S. Pat. No. 4,697,006 is coupled to the barrel for conductive heat transfer but requires a complex support to maintain the heater in contact with the barrel. The exemplary conductive heater also has by design an uneven or unbalanced heat distribution.

Conventional hairstyling appliances employ various methods and devices for regulating temperature including expensive negative temperature coefficient of resistance (NTC) or positive temperature coefficient of resistance (PTC) thermistors. These devices generally provide temperature control by changing the circuit resistance with increasing temperature within the barrel for example. In addition to the expense, some of these devices are cumbersome and are difficult to place within the barrel to obtain accurate temperature feedback.

In addition to the foregoing, hairstyling appliances employing inexpensive thin wire heater elements are not universally adapted for use with different voltage systems (e.g. 110 V in the United States versus 220 V in Europe). If not rewired, high voltage can cause the heater element to fail. Thus, a different heater element or special wiring is currently required for various voltage applications. It would be desirable therefore to have a heater element which, in combination with a suitable control circuit, would operate under different voltage conditions automatically without the intervention of the user. Such as system, if properly implemented, would also allow for the use of an inexpensive universal heater element.

In addition, U.S. and foreign standards require different operating frequencies which can adversely affect timing circuits and electronic controls. It would therefore be desirable to provide a control circuit which operates satisfactorily without regard to variations in frequency standards.

Other desirable features for a hair curling appliance include accurate temperature sensing, fast barrel temperature recovery when hair is wound on the barrel, indication that the appliance is at a proper operating temperature, automatic shut off, and noise insensitivity in a suitable compact, inexpensive and simple electronics package, with a minimum number of components.

SUMMARY OF THE INVENTION

The present invention is based upon the discovery that uniform heating of a hairstyling appliance may be achieved using a relatively light weight and reduced cost heating element in combination with a low cost diode advantageously employing its variable leakage current while heated for temperature feedback which are mounted in a cylindrical support in conductive heat exchange relation within the appliance. In addition, a power sensitive control circuit is adapted to drive the heater and automatically allow its operation under varying voltage levels and frequencies.

In an exemplary embodiment, the invention is directed to a heater element for a hair curling iron having a hollow tubular barrel. A multi-layer cylindrical sleeve includes first and second sheets of flat flexible non-electrically conductive materials formed as an inner support or core and an outer insulating cover. A lightweight electrically conductive heater element is wound on the core between the first and second sheets and a diode is supported on an exterior surface of the cover. The heater is adapted to be located within the tubular barrel in intimate thermal conductive contact therewith. The heater element is energized for transferring heat to the barrel and the diode is sensitive to the barrel and heater temperature for producing a control signal generally indicative of the barrel temperature.

In another embodiment, the heater is combined with a control circuit adapted to sense power applied to the appliance and to automatically adjust the power input level to the heater element in accordance with said input power. The control circuit includes means for sensing the change of input power indicative of the input voltage level being responsive to produce corresponding control outputs. Switching means is operatively coupled between the heater element and the control circuit for cycling power to the heater element in response to the corresponding outputs of the control such that total power input to the heater element is maintained as the voltage level of the input increases.

In another embodiment of the invention, a hair curling appliance employs a heater element, a low cost diode having a temperature dependent leakage current and a control circuit. The control circuit is sensitive to voltage input levels, for cycling power to the heater element in accordance with the level of voltage input to the appliance in order to prevent overload of the heater element. The control circuit further includes means for controlling the power delivered to the heater element in accordance with temperature feedback from the diode; means for desensitizing the control circuit from noise; an auto shut-off for deactivating the heater element after a certain time period and a voltage regulator.

DESCRIPTION OF THE INVENTION

FIGS. 1-5 illustrate an embodiment of a hair styling appliance such as a hair curling iron 10 according to the present invention. The curling iron 10 comprises a handle portion 12 which houses a solid state heater control 14, coupled between a heater 16 and a power cord 18 fed by a source of AC power.

Figure 1:
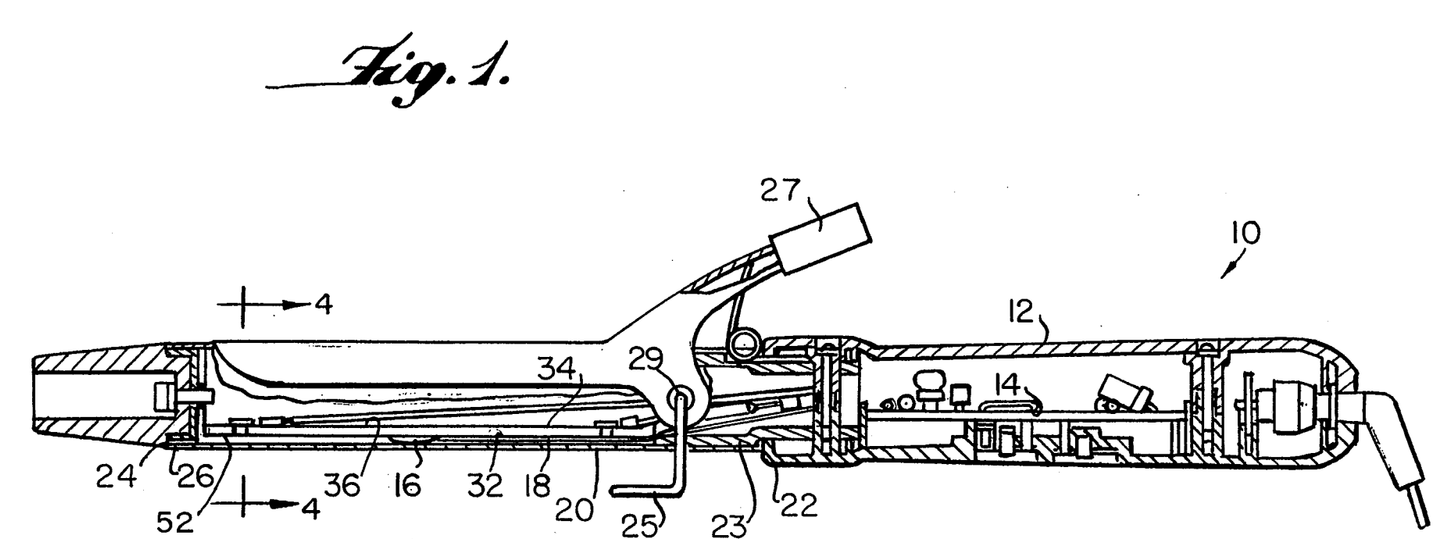
FIG. 1 is a fragmentary side sectional elevation of an exemplary curling iron in accordance with the present invention.

The curling iron 10 has a heated hollow cylindrical curling barrel 20 supported by the handle portion 12 at its proximal end 22 by means of a connector tube 23. A so called cool tip 24 is secured to the open distal end 26 of the barrel 20. The purpose of the cool tip 24 is to allow a user to manipulate the heated curling iron 10 by handling the heat insulated handle 12 and the cool tip 24 so as to roll curls in a known manner. Some hair styling appliances, not shown in detail but included within the invention, have a closed barrel end and do not employ a cool tip. A stand or rest 25 and a spring clip or flipper 26 are pivotally secured to the barrel 20 at pivot 29.

Figure 2:
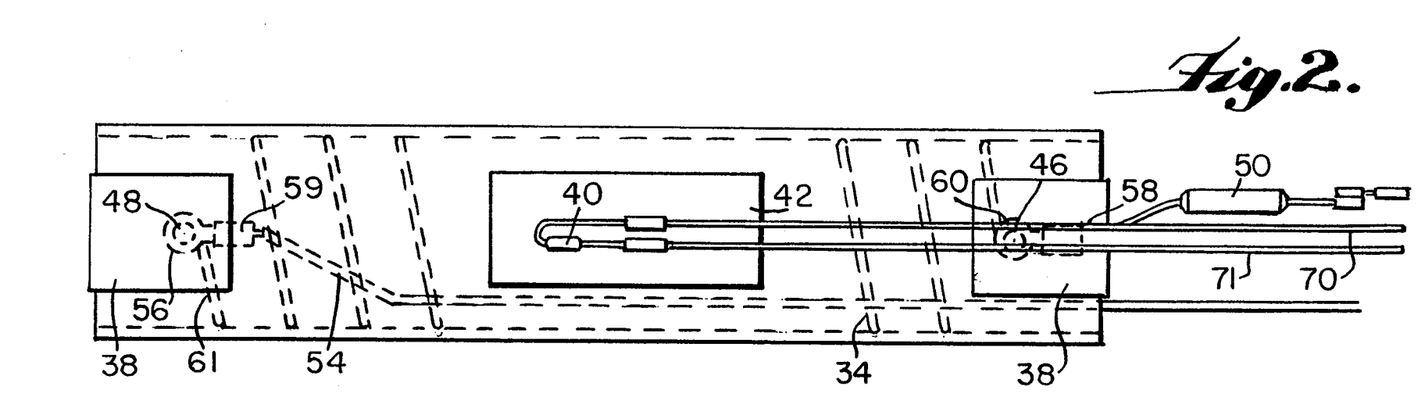
FIG. 2 is a plan view of the heater illustrated in FIG. 1.
Figure 3:
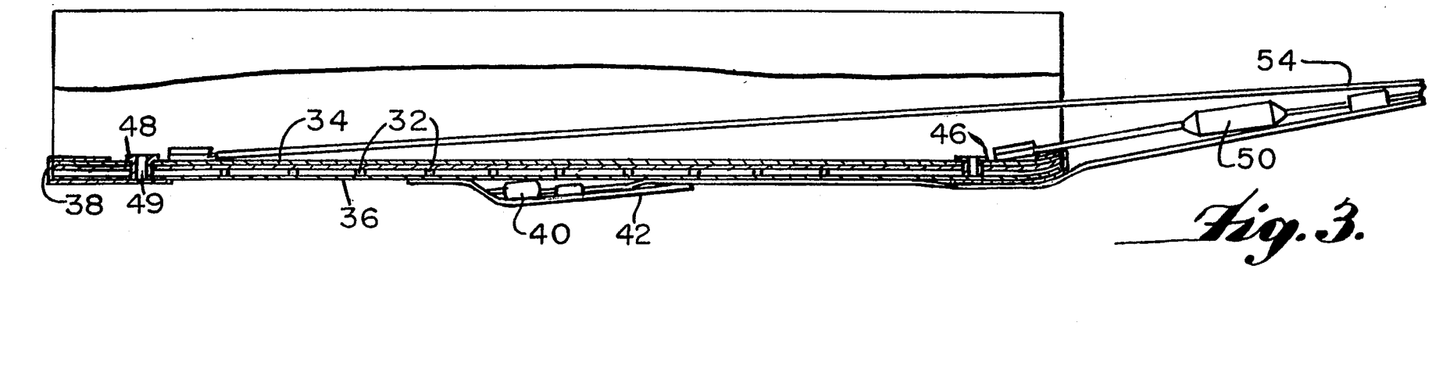
FIG. 3 is a fragmentary side sectional view of the curling iron taken along line 3—3 of FIG. 1.
Figure 4:
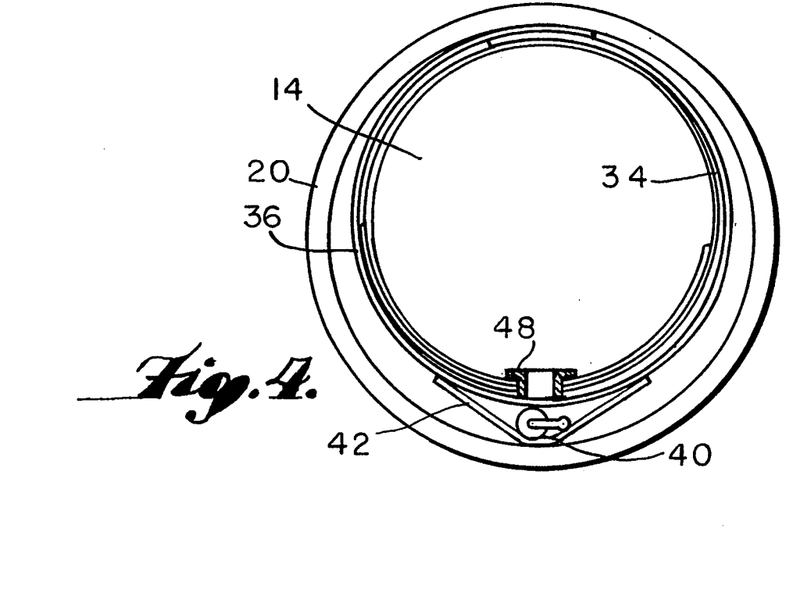
FIG. 4 is a sectional view of the curling iron taken along lines 4—4 of FIG. 1.

The heater 16 is located within the hollow barrel 20 as noted and includes a layered structure in the form of a selected length of resistance heater wire 32 (e.g. nichrome or an iron, chrome, aluminum alloy) spirally wrapped around a cylindrical mica paper core 34. One or more layers of a mica paper cover 36 surrounds the wire 32 and the core 34. The heater 16 is disposed within the barrel 20 in intimate thermal contact with the internal walls 37 thereof over a major portion of the cover 36 in order to conductively transfer heat to the barrel 20 upon energization of the heater wire 32. One or more lengths of dielectric, heat resistant adhesive tape 38 (e.g. Kapton tape sold by DuPont) secure the core 34 and cover 36 together as illustrated.

A solid state diode 40 exhibiting a negative temperature coefficient of resistance (NTC) is secured by a length of dielectric, heat resistant adhesive tape 41 (e.g. Kapton) to the exterior of the cover 36. Free ends 46 of the wire 32 are secured by ring terminals 46 and 48 punched through holes or apertures 49 in the core 32. A thermal fuse 50 is serially coupled to one of the ring terminals 46 via a lead 52; a lead 54 is connected to the other ring terminal 48 as shown. The leads 52 and 54 and the serially connected fuse 50 are coupled to the control circuit 14. In the event of overheating, the thermal fuse 50 opens the heater circuit 14.

The heater 16, the diode 40 and the thermal fuse 50 are snugly sleeved into the barrel 20 by an interference fit. Preferably, the heater 16 is in intimate thermal contact with a major portion of the interior wall 29 of the barrel 20. (In FIG. 4, the heater 16 is shown slightly separated from the barrel 20 for clarity of illustration.) When the heater 16 is energized, heat is efficiently transferred by conduction through the cover 36 to the barrel 20. It has been found that although heat transfer occurs through the mechanisms of conduction, convection and radiation, conduction by intimate thermal contact of the heater 16 and the barrel 20 is a primary heat transfer mechanism. The heater 16 extends lengthwise of the barrel 20 as illustrated in FIG. 1. The wire 32 is wrapped on the core 34 such that the distal end 52 of the heater 16 is spaced from the cool tip 24 to prevent overheating thereof so that it is maintained at a temperature which may be comfortably handled by the user.

Figure 5:
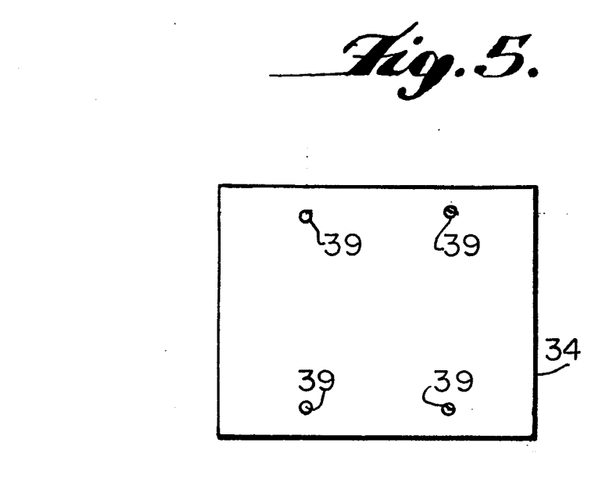
FIG. 5 is a plan view of a mica paper substrate forming the core element of the heater, the cover portion being identical except for the punched apertures.

The ring terminals 46 and 48 comprise circular annular rivet portions 56 and integral connector tabs 58. The rivet portions 56 are passed through the apertures 39 in the core 34 while the free ends 60 and 61 of the heater wire 32 are wrapped around the annular rivet portions 56 which are thereafter crimped over to form the core and to secure the wire 32 and the ring terminals 46 and 48 in place with respect to the core 34. Leads 52 and 54 are thereafter connected to the respective connector tabs 58 and 59 of the ring terminals 46 and 48.

The mica paper forming the core 36 and cover 38 is available in sheet form. The paper has a high dielectric strength per unit thickness and is a good electrical insulator at high temperatures. In the embodiment illustrated, the mica paper is 0.15 mm thick and has sufficient dielectric strength to meet safety standards for agency approvals in the U.S. and Europe. It is also a reasonably good conductor of heat and thus allows good heat transfer from the wire 32 to the barrel 20.

As illustrated in FIG. 5, the core 34 is a rectangular section 64 of the mica paper material which has been formed with the punched through apertures 49 spaced from the opposite marginal edges 65 and 66. The core 32 is rolled into a cylinder with the marginal edges 65 and 66 overlapping so that the apertures 49 are in alignment for receiving the ring terminals 46 and 58. The cover 34 is similar to the core 32 except that punched through holes 49 are not provided. After the core 34 is wrapped with the heater wire 32, one or more layers of the mica paper forming the cover 36, as required for safety, is wrapped about the wire wound core 34. Thereafter, the adhesive tape 38 secures the cover 36 to the core 34 as illustrated.

The diode 40 is secured to the exterior of the heater axially of the ring terminals 46 and 48 by the tape 41. When installed in the barrel 20, the diode 40 and the ring terminals 46 and 48 are located opposite a lower portion of the interior wall of the barrel 20 in closely spaced relationship while a major portion of the surface of the cover 36 is in contact with the barrel 20 as illustrated in the cross sectional illustrations of FIGS. 2 and 3. The diode 40 is coupled to the control circuit 14 by leads 70.

In the embodiment illustrated, the diode 40 is a relatively inexpensive off-the-shelf element having a temperature dependent leakage current which increases with temperature. As a result, the diode 40 exhibits a negative temperature coefficient of resistance (NTC). The diode 40 is not as expensive as or as large as conventional thermistors which have been used in prior arrangements. Indeed, the leakage current which is normally considered a defect is used to advantage in the invention. The accuracy of the temperature sensitivity of the present invention resides not primarily in the particular negative temperature coefficient resistance of the diode 40 but primarily in the control circuit which is responsive thereto.

In accordance with the invention, the control circuit 14 of the present invention is designed to provide a variety of functions including temperature feedback using an inexpensive NTC device in the form of a diode 40 to sense temperature; fast recovery from a load through temperature feedback; programmable indication of a ready to use indication set by time or sensor temperature; onboard voltage regulation; direct LED and SCR drives, including improved operation with a leaky SCR; automatic mains voltage power sensing; power duty cycling to allow a low cost heater to be used in 240 volt applications; improved immunity from line conducted noise spikes and automatic shut off.

Figure 6:
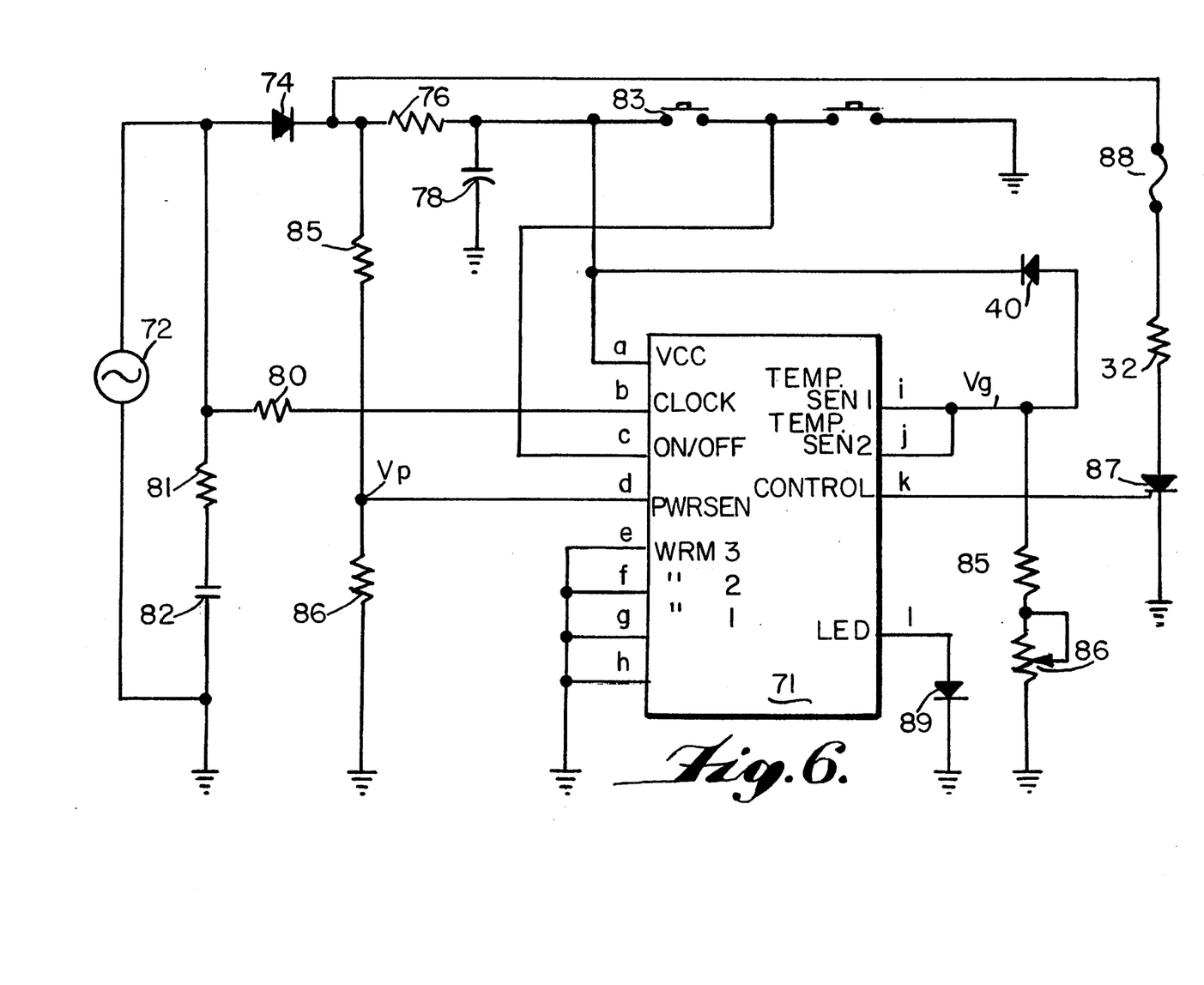
FIG. 6 is a schematic block diagram of the overall control of the hair styling appliance of the invention.

The overall layout of the control circuit 14 is illustrated in FIG. 6. A control block 71 which performs the various functions has inputs and outputs labeled (a)-(1), hereinafter discussed. Power 72 is provided over AC line 18. The control block 80 receives DC power on VDD input (a) from the line 18 via rectifier diode 74, and a ripple filter including dropping resistor 76 and capacitor 78. Clock input (b) receives clocking pulses via resistor 80. Capacitor 82 may be employed as a spike filter. A resistor 81 in series with capacitor 82 may be employed as a safety element if desired. ON-OFF input (c) is coupled to a node between respective ON and OFF momentary switches 83 and 84. Power sense input (d) receives power via diode 74 and a divider including resistors 85 and 86. Respective programmable WRM1, WRM2 and WRM3 inputs (e), (f) and (g) may be selectively coupled to ground (h) or VDD by trimmable leads. Respective bridged temperature sensor inputs (TEMP SEN1 and TEMP SEN2) (i) and (j) are coupled to DC via the back biased temperature sensing diode 40. A reference circuit including a fixed resistor 85 and variable resistor 86 sets the reference for the inputs (i) and (j). Control output (k) is coupled to the gate of a silicon control rectifier (SCR) 87. The SCR 87 is serially coupled to the heater 32 and thermal fuse 88. LED output (1) is coupled to light emitting diode (LED) 89.

Momentary activation of ON switch 83 provides a high or one input via diode 74 and resistor 76 to ON-OFF input (c). Likewise, momentary activation of OFF switch 84 provides a low or zero to ON-OFF input (c) from ground. The control output (k) gates SCR 87 ON to enable heater 33. As the temperature of the heater rises, diode 40 which is proximate to the barrel delivers an increasing leakage (reverse bias) current to temperature sensing inputs (i) and (j). The control block 71, in response to increasing temperature, regulates the control output (k) to gate the SCR 87 as described hereinafter.

Devices internal to control block 71, hereinafter described, coupled to inputs (i) and (j) sense the voltage Vg established at the node between diode 40 and resistor 85. When the voltage Vg is below a first threshold, the control output (k) gates SCR 87 ON. When the voltage Vg exceeds the threshold control (k) gates SCR 87 at a 50% duty cycle. When the voltage Vg exceeds a second threshold, control output (k) gates SCR 87 OFF.

The power sensor input (d) senses whether a half wave rectified voltage Vp at the node between resistors 85 and 86 is in a first or a second voltage range. If Vp is in the first range, e.g. 102-132 VAC, the control (k) drives SCR ON for each clock pulse. If Vg is in the second range, i.e., doubled, (e.g. 200-250 VAC) the SCR 87 is driven ON for one clock cycle and OFF for three clock cycles. Power is proportional to the square of the voltage so that the power is increased by a factor of four when the voltage doubles. In accordance with the invention, the duty cycle of the SCR 32 is reduced to one of four clock cycles as the voltage doubles. This causes the same net power to be supplied to the heater 32 when the voltage doubles.

The respective programmable WRM1, WRM2 and WRM3 inputs (e), (f) and (g) allow the control block to be operative for illuminating LED 89 in a variety of desirable modes. For example, LED 89 may be illuminated ON to indicate that the appliance 10 is turned on. LED 89 may be programmed and flash to indicate that the appliance has reached the desired operating temperature, i.e. it is ready to use. Alternately, LED 89 may be programmed to flash when the appliance has been activated for one of a plurality of specific times, or it may simply be illuminated any time the user switches the appliance on. The Table below summarizes the state of the respective WRM inputs (e), (f) and (g).

TABLE 1

| Warm-up Time vs. Program Input Logic Level | | | |
|---|---|---|---|
| (e) WRM 3 | (f) WRM 2 | (g) WRM 1 | Condition LED 89 |
| 0 | 0 | 0 | * |
| 0 | 0 | 1 | Time 1 |
| 0 | 1 | 0 | Time 2 |
| 0 | 1 | 1 | Time 3 |
| 1 | 0 | 0 | Time 4 |
| 1 | 0 | 1 | Time 5 |
| 1 | 1 | 0 | Time 6 |
| 1 | 1 | 1 | ** |

Figure 7A:
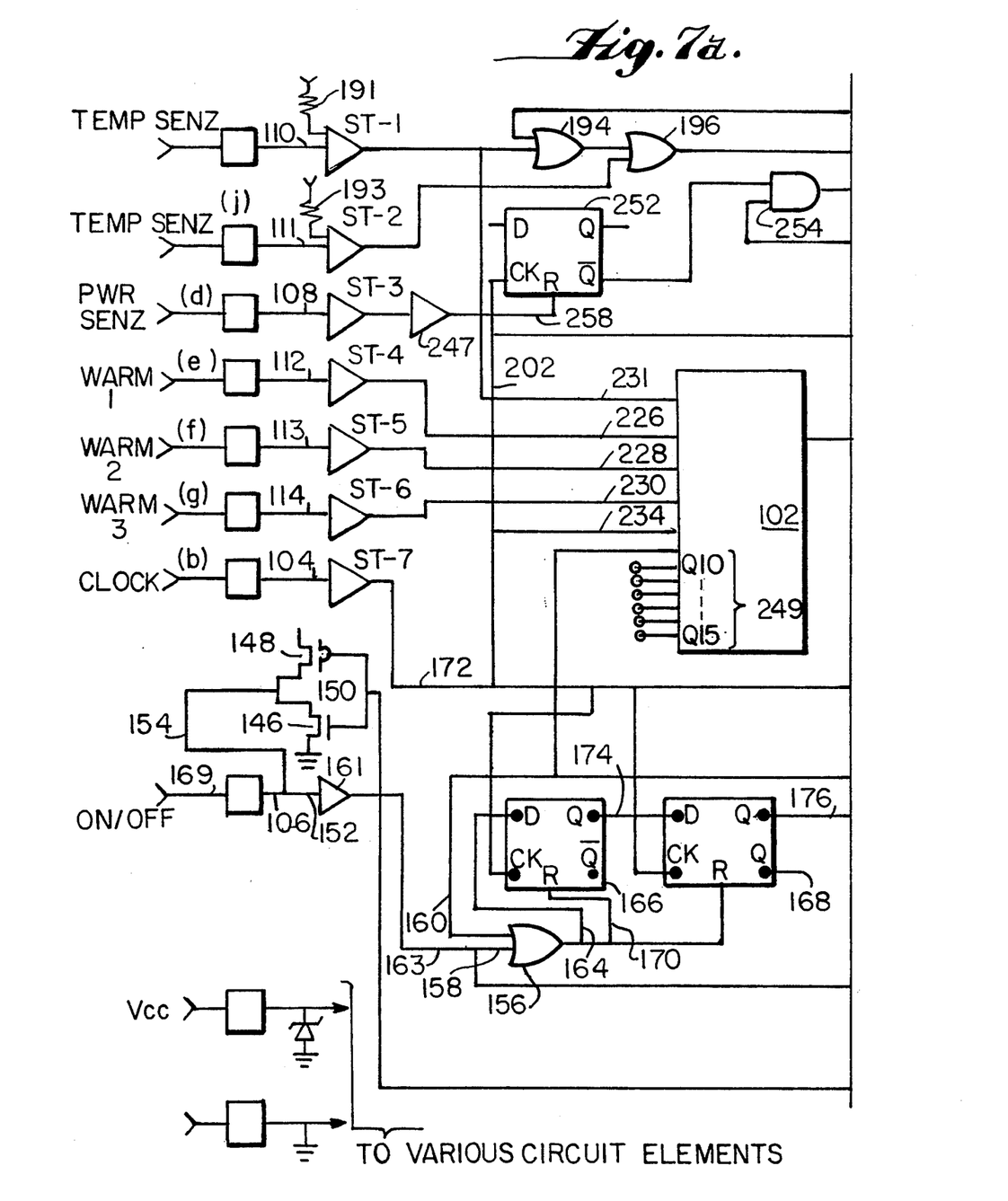
FIG. 7 is a schematic block diagram illustrating details of the control circuit for the hairstyling appliance of the present invention with input and output circuits.
Figure 7B:
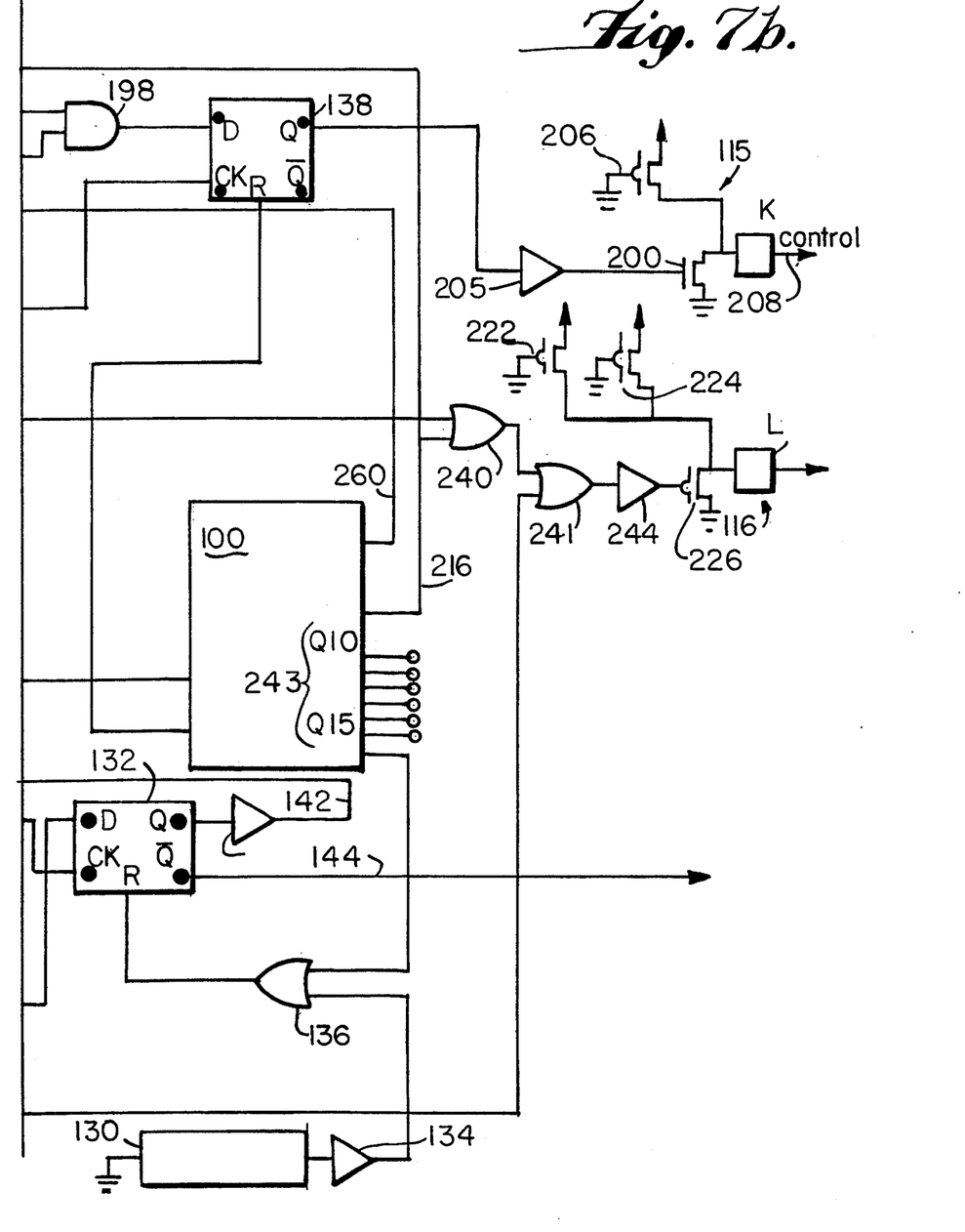

*-Flashing starts when first threshold is first exceeded
**-Always on when unit is on
Time 1–Time 6-flashing when on for selected elapsed time
0-grounded
1-open A more detailed illustration of the control circuit 14 is shown in FIG. 7. The control circuit 14 has the same inputs and outputs (a)-(1) shown in FIG. 6, and includes a multistage counter a duty cycle logic block 102; a clock gate 104; an on-off gate 106; power sensing gate (PWRSEN) 108; temperature sensing gates 110 and 111 (TEMP SEN1; TEMP SEN2); respective programmable WRM1, WRM2 and WRM3 gates 112, 113 and 114; control gate 115; and LED drive gate 116. The counter 100, duty cycle logic 102 and the various logic gates (described hereinafter) may be incorporated within the overall system logic 120 which is in the form of an application specific integrated circuit (ASIC). The various inputs, e.g. from the temperature sensing gates 110 and 111; the power sensing gate 108; the programmable WRM 1–WRM3 gates 112-114; the clock 104; and the ON-OFF gate 106 are coupled to the system logic by Schmitt triggers ST-1–ST-7, as illustrated.

The system logic 120 operates from the clock gate 104 which is derived from the input source 72 over power line or mains 18 (FIG. 6). The clock gate 104 is fed at clock input (b) from the input mains 18 through large resistor 80. One or more series diodes, not shown, may be employed to protect the system logic 120 by limiting the voltage on the clock input (b) to about a relatively small diode voltage drop of about 0.65 volts above the supply voltage VDD and below ground. Because the clock input (b) impedance is high and the mains voltage 72 is large, the clock input signal moves from ground to the supply voltage VDD quickly. This causes the clock signal to transition close to the zero cross-over of the source voltage 72. Thus, the clock gate 104 operates at the frequency of the mains voltage 72 (e.g. 50 or 60 Hz). The clock gate 104 is coupled to the clock input of the counter 100 by Schmitt trigger ST-6. Various points on the counter 100 are used by the system logic 120.

The system logic 120 includes logic elements configured for performing the various functions associated with the control of the present invention. For example, AND, OR, exclusive OR, inverters and flip flops operate to perform the various functions as hereinafter described. In particular, the flip flops discussed hereafter are D type which have a D input, a clock input CLK, respective normal and inverted outputs (Q and Q bar) and a reset R input. These devices are known to produce corresponding high and low outputs respectively on Q and Q bar when the D input is high, and produce opposite polarities when D is low or when the reset is activated. The outputs clock between high and low in response to the clock input.

When power is first applied to the system, a power on-off reset gate 130 resets power on-off flip flop 132 through inverter 134 and OR gate 136. The power on-off flip flop 132 resets the counter 100 (RSETB) and control flip flop 138 (R) via buffer 140 and master reset lead 142. When power on-off flip flop 132 is reset, the Q bar output on lead 144, which is coupled to the on-off gate 106 goes low. The on-off gate 106 includes a pair of oppositely poled FET switches 146 and 148, coupled in series, as shown. A node 150 between FETs 146 and 148 is coupled to on-off line 152 via lead 154. When the power on-off flip flop 132 is reset, Q bar is low, which through line 144 causes the FET switch 146 to conduct grounding the on-off line 152.

An exclusive OR gate 156 has respective inputs 158 and 160. Input 158 is coupled to the on-off line 152 as shown over the interconnecting buffer 161 and lead 163. The other input 160 is coupled to the Q output of power on-off flip flop 132 via buffer 140, lead 142 and lead 165. As noted above, when the power is first detected, the power on-off flip flop 132 is reset causing its Q output to go high. While its Q bar output goes low, the counter 100 is held reset until the on-off line 152 is pulled high by a momentary actuation of the on switch 83 (FIG. 6) coupled to on-off gate 106 over line 169. When this occurs, the inputs to exclusive OR gate 156 become different causing a high or one signal to be presented via leads 162 and 164 to the D input of flip flop 166. At the same time, the reset signal is removed from flip flops 166 and 168 over common leads 170.

Clock signals from clock gate 104, in the form of positive and negative transitions, are produced on lead 172. The next positive clock transition following lowering of the on-off line 152 of on-off gate 106 causes Q output of flip flop 166 to go high and present a high to the D input of flip flop 168 over line 174. If the external on switch 83 goes low before the next positive clock transition, flip flop 166 will be reset over line 170 and the Q output of flip flop 168 will remain low. This prevents the system from turning on when short spikes caused by bouncing contacts or radio interference are present on the on-off line 152. If however, the on-off line 152 remains high, indicating a definite actuation of on switch 83, the next positive clock transition causes Q output of flip flop 168 to go high and to clock the state of power on-off flip flop 132 over lead 176. As a result, the reset signal to the counter 100 is removed from line 142, enabling it to count in accordance with clock transitions sensed on lead 172. Removal of the reset signal on line 142 also enables the control flip flop 138 to be controlled by other circuitry as hereinafter described. The clocking of power on-off flip flop 132 also causes its Q bar output to go high causing FET switch 146 to open the ground connection with the on-off line 152, and at the same time, causes FET 148 to conduct to thereby pull up the on-off line 152, which remains high until the external OFF switch 84 (FIG. 6) is actuated.

If the on-off line 152 is pulled low by the external switch 84, the inputs to exclusive OR circuit 156 again become different, and if the on-off line 152 remains low for at least two clock transitions, the Q output of power on-off flip flop 132 will be driven low causing the circuit to turn off.

If the system remains on for a time sufficient for the counter 100 to reach a maximum number of counts, a time-out signal is produced on output 180 which is coupled to the reset input of power on-off flip flop 132 via OR gate 136 thereby causing the system to turn off.

Temperature regulation and control is achieved in accordance with the present invention by employing the leakage current produced by diode 40 which is connected between the supply VDD and the bridged temperature sensing inputs (i) and (j) in the respective temperature sensing gates 110 and 111. Each Schmitt trigger ST-1 and ST-2 has a set point established by a corresponding resistor 191 and 193 coupled to ground. ST-1 has threshold levels between A and B, e.g. about 1.2 volts and 1.6 volts; and ST-2 has thresholds C and D, e.g. about 2.2 volts and 3.2 volts. Of course, it should be understood that the voltage levels recited are useful in the embodiment discussed herein they are exemplary only. A low or zero input on both inputs (i) and (j) of temperature sensor gates 110 and 111 causes a high or one to be presented to the D input of control flip flop 138 via AND gate 194, OR gate 196 and AND gate 198, as shown. The Q output of control flip flop 138 is coupled to the control gate 115 which includes an FET switch 200.

A low on both temperature sensing inputs (i) and (j) causes a high to be presented to the D input of control flip flop 138. The next clock to transition over clock line 172 and lines 202 and 203 will set the Q output of control flip flop 138 high driving FET 200 to a nonconducting state via inverter 205. When FET 200 is off, pull-up FET 206 delivers a gating signal to the gate lead 212 of SCR 87 (FIG. 6) via control gate output (k) which thereby applies power to the heater 32. As the diode 40 heats, leakage current increases whereby the voltage to the temperature sensing input (i) rises eventually exceeding B volts causing a one to be present on AND gate 194. At the same time, a square wave output (e.g. 1 Hz) signal from the counter 100 is coupled to the gate 194 over lead 216. The signal causes control flip flop 138 to switch the D line ON and OFF likewise causing the control gate 115 to clock or switch the SCR 87 to a 50% duty cycle. This reduces power to the heater 32 to thereby slow the temperature rise and reduce temperature overshoot. As the diode 40 continues to heat, the voltage on the temperature sensing input (j) will eventually exceed the highest threshold (D volts) and thereby apply a one to OR gate 196 which through its inverted output places a zero on the D input of control flip flop 138 via gate 198. This causes FET 200 to conduct thereby driving control gate 115 output (k) to ground. FET 200 is capable of sinking a sufficiently high current so that the SCR 87 is positively turned off even if there is significant leakage current on the gate lead 208. In an exemplary embodiment, FET 200 is capable of carrying a current of about 8 ma.

As the diode 40 cools, the voltage level on temperature sensing 1 input (i) eventually drops below B volts and the square wave signal from the counter on line 216 is again applied to the D input of control flip flop 138 causing the heater 32 to be cycled at a reduced power or duty cycle. If the diode 40 continues to cool, the temperature sensing 1 input (i) falls below the lower threshold A volts and the D input of the control flip flop receives a one or high input to maintain the SCR 87 and thus the heater 32 on without cycling.

Counter 100 is an 18 stage ripple counter made by connecting the D line of each counter to its Q-bar line and tieing the Q-bar line to the clock of the succeeding stage. A low level on the master reset line 142 drives the Q output of every stage to a logical 0. The clock input of the first is connected to the master clock input, CLK, by wire 234. An output from the 5th stage is connected to AND Gate 194 by wire 216. Line 216 will complete one complete cycle in $2^5$ or 64 clocks which with a 60 Hz CLK frequency will be slightly longer than 1 second. Various outputs are connected from the counter stages by wires 249 to the Time Decoder, 102. After approximately 1 hour of operation with a 60 Hz clock input, gates connected to flip flops inside the counter block cause the TIME-OUT outline 131 to go high which resets ON-OFF flip flop 132 via NOR gate 136 turning the time circuit off.

The heater 32 has a considerable amount of excess power. Thus, the unit heats to operating temperature quickly and maintains the temperature when a load is present such as when wet hair is wrapped around the curling iron. At the same time accurate temperature sensing by diode 40 allows for the cycling of the power in the intermediate temperature region to prevent an overshoot condition.

In order to provide an indication to the user that the appliance is activated and ready for operation, respective programmable WRM1–WRM3 inputs (e), (f) and (g) may be employed to control the light emitting diode 87 (FIG. 6), driven by diode drive gate 116. The LED 89 is driven by a pair of pull-up FETs 222 and 224 which provide a small current, for example 3.2 ma, when the LED 89 is on. FET 226 turns off the LED 89 by grounding the LED output gate 116. The LED 89 serves various selectable indicating functions. For example, when it is fully illuminated, it may indicate to the user that the appliance is turned on. When flashing, it may indicate that the appliance is at operating temperature, the flashing rate is typically at the same rate as the duty cycling described above (e.g. 1 Hz rate). The LED 89 may also be programmable to flash in order to indicate that the appliance has been on for a given time, or it can be illuminated to indicate simply that the appliance is on. The various conditions are illustrated in the Table discussed herein above which covers eight different operating conditions.

The time decoder 102 and the counter 100 function together to produce the signals for driving LED 89. The time decoder block 102 has a plurality of programmable inputs 226, 228 and 230 which are coupled to WRM1, WRM2 and WRM3 respectively. The inputs 226, 228 and 230 may be selectively grounded or raised to VDD to program the duty cycle block 102 to produce corresponding outputs for LED driver 116. The clock gate 104 drives the duty cycle block 102 via lines 172, 202 and 234 to provide a signal for the latch (not shown) contained in the time decoder block. One configuration of the programming lines 226, 228 and 230 (i.e. all grounded) causes the duty cycle block 102 to flash upon the occurrence of a one on temperature sensing input (i) causing the flash line 232 of duty cycle block 102 to operate at the square wave frequency through NOR gates 240 and 241 and inverter 244 to the input of FET 226. The latch in time decoder block 102 maintains the flash line 232 on even if the temperature sensing input (i) goes low as a result of temperature changes in the appliance which result from loading and the like. The 1 Hz square wave from counter 100 likewise enables OR gate 240 over line 216 in conjunction with the power on indication from power on-off flip flop 132 over line 144 and 246 as shown.

Other configurations of the programming lines 226, 228 and 230 may be employed to cause variations in the flashing rate at various time intervals from initial turn on. This may he required in appliances such as hair setters that use the diode 40 to sense the temperature of a metal plate (not shown) rather than the actual curlers. Such a unit would reach the operating temperature in a given amount of time as determined by selected outputs 248 of the counter 100 which would be fed hack to the corresponding inputs 249 of duty cycle block 102 to select an appropriate time to begin the flashing cycle.

Figure 8:
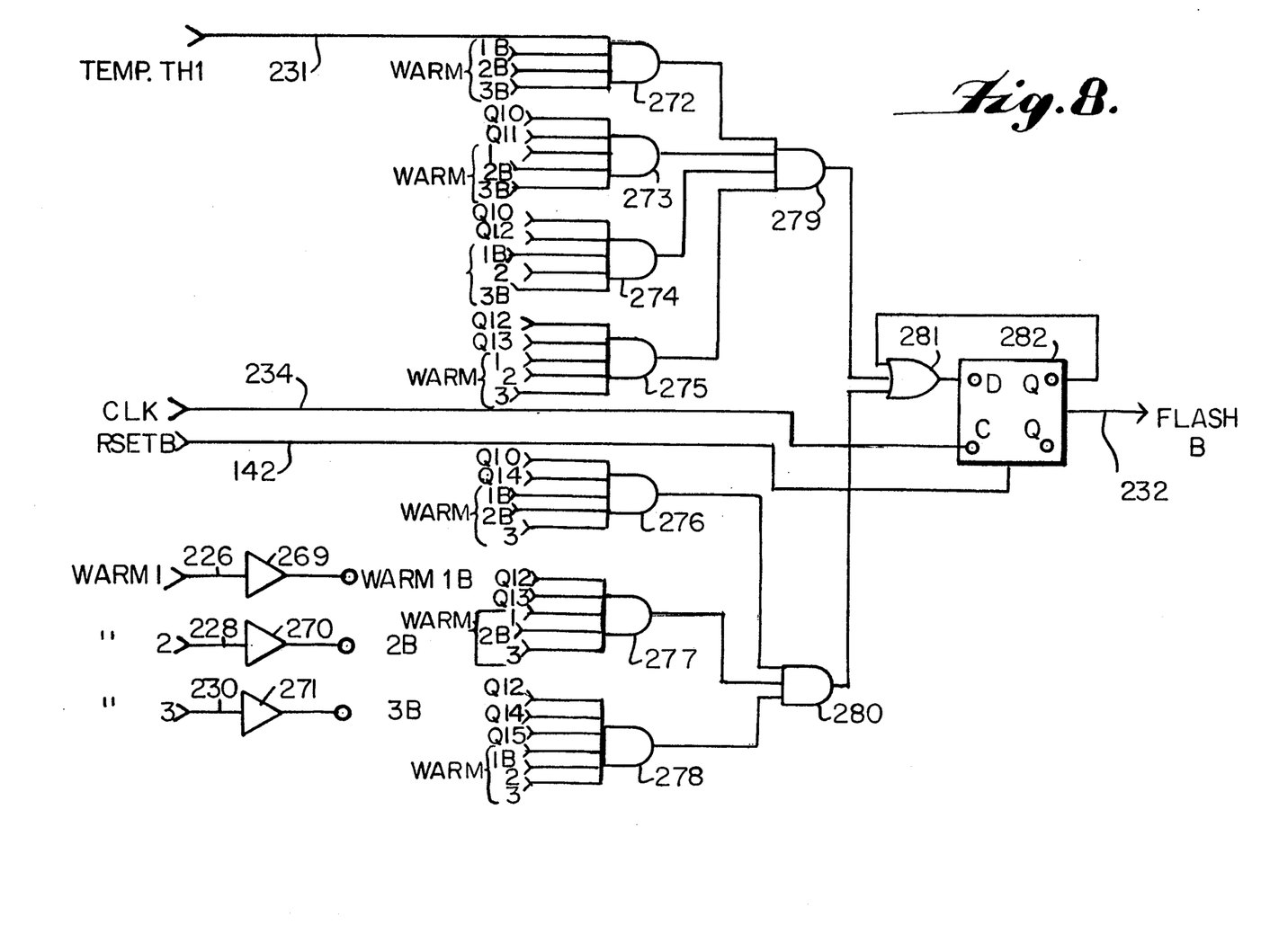
FIG. 8 is a schematic diagram of the time decoder shown in FIG. 7.

Details of the time decoder 102 are shown in FIG. 8. The time decoder 102 uses gates and latches to cause the FLASHB line, wire 232, to become low at a particular time after the unit has been turned on. A low on wire 232 enables the approximately 1 Hz signal on wire 216 to pass through NOR Gates 240 and 241 to flash the LED at a 1 Hz rate. Three signals set the time to flash interval, WARM1, WARM2 and WARM3, wires 226, 228 and 230 respectively. The three programming signals are decoded by gates and combined with outputs from the counter 100 and a signal TEMP-TH1 line 231 to determine when the LED begins flashing.

The time decoder 102 uses gates 272 to 278 to decode the WARM lines 226, 228 and 230 and their complements from inserters 269, 270 and 271. If WARM1B, WARM2B and WARM3B inputs to NAND gate 272 are all high, and TEMP-TH1 line 231 goes high, indicating the appliance has reached operating temperature, the output of NAND gate 272 will go low. NAND gate 279 output will go high and OR gate 281 will provide a 1 to the D line of flip flop 282. On the next positive transition of CLK line 234, Q of flip flop 282 will go high and FLASHB line 232 will go low causing the LED to flash. Since one of the inputs to OR 281 is from Q of flip flop 282, the D line will remain high even if TEMP-TH1 line 237 again goes low.

Gates 273 to 278 operate in a similar manner except they use inputs from the counter to determine when flip flop 282 is set to a 1. All 8 possible combinations of the WARM lines are decoded except all high. If this condition is programmed, flip flop 282 will never be set and the LED will remain on without flashing until the unit turns off and flip flop 282 is reset by RSETB line 142. The time decoder 102 may be implemented in the form of a programmable read only memory (PROM).

An important feature of the present invention is the employment of a automatic power sensing to allow operation of the unit when the appliance is coupled to any one of a variety of available power sources, for example, a nominal 120 V or a 240 V line, depending upon the country in which the appliance is to be utilized. Also, the system is designed to operate on any conventional frequency, for example, 50 or 60 Hz also dependent upon the location.

The node of the resistive divider including resistors 85 and 86 (FIG. 6) is fed to the input (d) of power sensing gate 108. The divider is connected between the mains 18 of the power line source 72 and ground. The input (d) is coupled via Schmitt trigger ST-3 and inverter 247 to the reset input of flip flop 252. If the source voltage sensed is below the threshold of the Schmitt trigger ST-3, e.g. 3.8 volts, the reset line of gate 252 is high and the Q output of flip flop 252 is set high by the next positive clock transition sensed over lines 172 and 202. This places a one on gate 254 allowing the control flip flop 138 to be controlled as previously noted. If the main voltage is high enough to exceed the threshold of the Schmitt trigger ST-3 (e.g. greater than 3.8 volts), the flip flop 252 is reset over line 258. This reset occurs later than the clock transition because the power sensing gate 108 receives a sine wave input from the power line and the delay results from the time taken by the sine wave to reach the threshold of the Schmitt trigger ST-3. Thus, gate 252 is continuously reset before the next positive clock transition thereby presenting a one or high signal to gate 254 and allowing the power duty signal from the counter 100 on line 260 to gate the D line of control flip flop 138. The power duty line 260 is governed by the clock 232 and is low for one clock cycle and high for three. If the difference between the high and low source voltage 72 is a factor of two, for example, 120 volts versus 240 volts, exactly the same amount of power is delivered to the heater 32 because the SCR 87 is on for one quarter of the time. The automatic sensing feature may be disabled to default to either a quarter or full duty cycle by tying the power sensing input (d) to Vcc or ground.

In accordance with the present invention, spike sensitivity of the system has been reduced by employing the Schmitt triggers ST-1–ST-7 at all crucial inputs in the system in order to avoid the influence of short noise spikes which may be present. None of the flip flop clock lines, for example, are connected to input lines at all but are isolated by means of the Schmitt triggers thereby reducing the possibility of asynchronous operation. In addition, all functions recover in one clock cycle from any noise disturbance.

While there has been described what at present are considered to be the preferred embodiments of the present invention, it will be readily apparent to those skilled in the art that various changes and modifications may be made therein without departing from the invention and it is intended in the appended claims to cover such changes and modifications as fall within the true spirit and scope of the invention.

Voltage regulation may be provided by tying Vcc to ground by means of a zener diode. Other appropriate voltage regulation methods may also be employed as desired.

What is claimed is:

1. A heater element for a hair curling iron having a tubular heater barrel comprising:
   a multilayer cylindrical sleeve sized to closely conform circumferentially to the interior of the tubular heater barrel and including first and second sheets of flat, flexible nonconductive substrate materials formed as an inner support and an outer cover and an electrically conductive resistive wire, heater element located between the first and second sheets and being wound circumferentially on the inner support;
   a diode supported on an exterior surface of the outer cover member, said sleeve and diode carried thereby adapted to be located within the tubular barrel with the diode located between the sleeve and the barrel in intimate thermal contact therewith, said heater being electrically energizable for transferring heat to the barrel through the outer cover member and said diode being sensitive to the barrel temperature for providing a signal indicative of the temperature of the barrel as it is heated.

2. The heater element of claim 1, wherein said flat, flexible nonconductive substrate material comprises mica paper.

3. The heater element of claim 1, further comprising a pair of ring terminals secured to the inner support near free ends thereof, said ring terminals for connection to respective ends of the conductive heater element wound about said support.

4. The heater element of claim 3, wherein inner support has paired apertures located near marginal edges and the support is formed of a cylinder in which the paired apertures are aligned for receiving the corresponding ring terminal therethrough.

5. The heater element of claim 1, further comprising a thermal fuse in series with the conductive heater element.

6. The heater element of claim 1, further comprising means for securing the inner and outer support members together.

7. The heater element of claim 6, wherein the means for securing the inner and outer support members together includes adhesive tape.

8. The heater element of claim 1, further comprising means for securing the diode to the outer surface of the cover including an electrically insulating adhesive tape.

9. The heater element of claim 1, wherein the outer cover is in intimate thermal contact with an interior of the barrel over a substantial surface portion thereof for enabling heat transfer between the heater element and the barrel primarily by thermal conduction.

10. A heater control for a heating element of a hair curling iron actuable from a line source comprising:
    a solid state switch coupled to the heating element being selectively actuable for energizing the heating element;
    a solid state diode in heat exchange relationship with the appliance for sensing the temperature thereof, said diode having a negative temperature coefficient of resistance;
    sensing means responsive to the line source for sensing when the line source is above a selected threshold; and
    logic means responsively coupled to the diode and to the sensing means and operatively coupled to the switch for selectively actuating the switch upon achievement of a plurality of temperature and power conditions, said logic means including first gating means for maintaining the switch ON in a first temperature range and second gating means for cycling the switch ON and OFF for a selected duty cycle during a second higher temperature range so that the energy supplied to the heater is reduced for preventing temperature overshoot of the heater element, said logic means further including third gating means for producing a power gating signal for cycling the power applied to the switch ON and OFF at first selected rate when the line source is above the threshold and ON and OFF at a second selected rate when the line source is below the threshold, such that the power delivered to the heating element is reduced to an amount which does not exceed the power delivered to the heating element when the line source is below the threshold.

11. The heater control of claim 10, further comprising programmable means responsive to an on condition of the appliance producing a first signal indicative of said on condition, means responsive to the diode for modifying the first output to indicate achievement of a selected temperature.

12. The heater control of claim 11, wherein the first indication is a steady output and the second indication is a pulsed output and a light emitting diode is responsively coupled to the programmable means for visually indicating an on condition in accordance with the steady output and a flashing indication indicative of achievement of the desired temperature.

13. The heater control of claim 10, further comprising timer means for gating the first and second gating means.

14. The heater control of claim 10, wherein the appliance has a power switch and the heater control further comprises a shift register of at least two bits coupled to the power switch for sensing positive indication of a closure of said switch for energizing the appliance when the switch remains closed for a plurality of clock cycles.

15. The heater control of claim 11, wherein the programmable means comprises a programmable read only memory.

16. A hair curling appliance actuable by a line source comprising:
a heater element including:
a multilayer cylindrical sleeve including first and second sheets of flat, flexible nonconductive substrate materials formed as an inner support and an outer cover and an electrically conductive heater element between the first and second sheets wound on the inner support;
a diode supported on said sleeve adapted to be located within the tubular barrel in intimate thermal contact therewith, said heater being electrically energizable for transferring heat to the barrel and said diode being sensitive to the barrel temperature for providing a signal indicative of the temperature of the barrel as it is heated; and
a heater control including:
logic means responsive to the line source for selectively applying power to the heater element in accordance with said line source, such that, when the line source exceeds a threshold, power to the heater element is regulated to a substantially constant level not to exceed the power applied when the line source is below the threshold.

17. The hair curling appliance of claim 16, wherein the means for applying energy to the heating element includes a line voltage sensor for producing an output corresponding to the said line source and logic means for reducing power to the heater element when the output signal indicative of the line source exceeds a predetermined level indicative of a line source in excess of the threshold.

18. The hair curling appliance of claim 17, wherein the logic means includes gating means for gating power to the heater element to a level not greater than power applied when the line voltage is below the threshold.

19. The hair curling appliance of claim 18, when the gating means reduces power applied to the heater in proportion to the square of the voltage when the voltage exceeds the threshold.

20. The heater control of claim 17, further comprising timer means for sensing a total elapsed time from initial energization of the heater for disabling the heater element after a given elapsed time.

21. A heater element for a hair curling iron having a tubular heater barrel comprising:
a multilayer cylindrical sleeve sized to closely conform circumferentially to the interior surface of the barrel and including first and second sheets of flat, flexible nonconductive substrate materials formed as an inner support and an outer cover and an electrically conductive resistive wire heater element between the first and second sheets wound on the inner support; and
a diode supported on said sleeve adapted to be located within the tubular barrel proximate thereto and in intimate thermal contact therewith, said heater being electrically energizable for transferring heat to the barrel and said diode being sensitive to the barrel temperature for providing a signal indicative of the temperature of the barrel as it is heated.

* * * * *